(12) United States Patent
Ashodia

(10) Patent No.: US 7,382,074 B2
(45) Date of Patent: Jun. 3, 2008

(54) ALTERNATE CURRENT POWER GENERATOR

(75) Inventor: Dineshbhai S. Ashodia, Rajklot (IN)

(73) Assignee: Society for Research and Initiatives for Sustainable Technologies and Institutions, Ambawadi, Ahmedabad (IN)

( * ) Notice: Subject to any disclaimer, the term of this patent is extended or adjusted under 35 U.S.C. 154(b) by 180 days.

(21) Appl. No.: 11/342,733

(22) Filed: Jan. 30, 2006

(65) Prior Publication Data
US 2007/0176427 A1    Aug. 2, 2007

(51) Int. Cl.
*H02K 1/00*      (2006.01)
*H02K 21/00*     (2006.01)

(52) U.S. Cl. ..................... 310/190; 310/191
(58) Field of Classification Search ............... 290/1 R, 290/1 A; 310/191, 190, 114, 268
See application file for complete search history.

(56) References Cited

U.S. PATENT DOCUMENTS

| | | | | |
|---|---|---|---|---|
| 865,068 | A * | 9/1907 | Larson | 310/75 B |
| 963,412 | A * | 7/1910 | Wilson | 310/154.31 |
| 1,229,308 | A * | 6/1917 | Morgan | 310/75 R |
| 1,531,573 | A * | 3/1925 | Ruthven | 246/63 A |
| 2,586,577 | A * | 2/1952 | Stivin | 310/68 E |
| 2,718,157 | A * | 9/1955 | Schaub | 477/37 |
| 3,283,190 | A * | 11/1966 | Applegate | 310/162 |
| 3,312,887 | A * | 4/1967 | Reese et al. | 388/816 |
| 3,713,015 | A * | 1/1973 | Frister | 322/28 |
| 4,163,914 | A * | 8/1979 | Keyes | 310/103 |
| 4,369,658 | A * | 1/1983 | Silhouette | 73/507 |
| 4,920,295 | A * | 4/1990 | Holden et al. | 310/209 |
| 5,821,710 | A | 10/1998 | Masuzawa et al. | |
| 6,555,941 | B1 * | 4/2003 | Zepp et al. | 310/191 |
| 2002/0047411 | A1 * | 4/2002 | Mo | 310/103 |
| 2003/0057792 | A1 * | 3/2003 | Yang | 310/191 |

FOREIGN PATENT DOCUMENTS

JP        7-236259        9/1995

* cited by examiner

*Primary Examiner*—Julio Gonzalez
(74) *Attorney, Agent, or Firm*—Kirkpatrick & Lockhart Preston Gates Ellis LLP

(57) ABSTRACT

The invention relates to an alternate current power generator with a primary drive shaft having a set of two magnets and an armature and a governor. The governor moves the magnets and armature with respect to one another. In another embodiment, the alternate current power generator has a secondary drive shaft, weighted flexible strips attached to the secondary drive shaft with connectors such that the flexible strips' weights cause the strips to move outward upon rotation, drawing the connectors closer together.

13 Claims, 6 Drawing Sheets

ALTERNATE CURRENT POWER GENERATOR

TECHNICAL FIELD OF THE INVENTION

This invention relates generally to using a centrifugal governor and more specifically to a centrifugal governor in an alternate current power generator to regulate power output.

BACKGROUND OF THE INVENTION

Windmills provide energy with limited environmental impact. However, since wind speeds are not constant from day to day or even throughout the course of a day, current wind generators are not always a dependable source of constant power. Specifically, currently available generators typically cannot generate power until a threshold of wind speed is met.

To start the generator, the wind speed must be high enough to overcome inertial and frictional effects of the mechanical components and the resistive force caused by the movement of the magnetic flux in generating current in the generator windings. Thus, typical generators require high wind speed before sufficient rotational speed is obtained in the generator to generate power. This poses a problem for low wind speed locations and causes power loss in starting the generator initially. The present invention addresses these issues.

SUMMARY OF THE INVENTION

The invention relates to an alternate current power generator with a primary drive shaft having a set of two magnets, an armature and a governor. The governor moves the magnets and armature with respect to one another. In one embodiment, the armature is fixed and the magnets move relative to the armature. In another embodiment, the governor includes a secondary drive shaft.

In one embodiment, the governor has flexible strips with centrally located weights. In another embodiment, the flexible strips are attached to the secondary drive shaft with connectors. The weights on the flexible strips cause the strips to move outward upon rotation, drawing the connectors closer together. In other embodiments, one or more springs are located between the connectors. In yet another embodiment, the governor has two lever arms, connecting the connectors and the magnets. Each lever arm moves a respective magnet relative to the armature as the governor rotates.

In another embodiment, the secondary and primary drive shafts are connected through either a belt or a gear assembly. In still another embodiment, the governor's flexible strips are positioned about the secondary drive shaft to permit balanced rotation.

BRIEF DESCRIPTION OF THE FIGURES

The foregoing and other objects, aspects, features, and advantages of the invention will become more apparent and may be better understood by referring to the following description taken in conjunction with the accompanying drawings, in which.

DETAILED DESCRIPTION OF THE INVENTION

Figure 1:
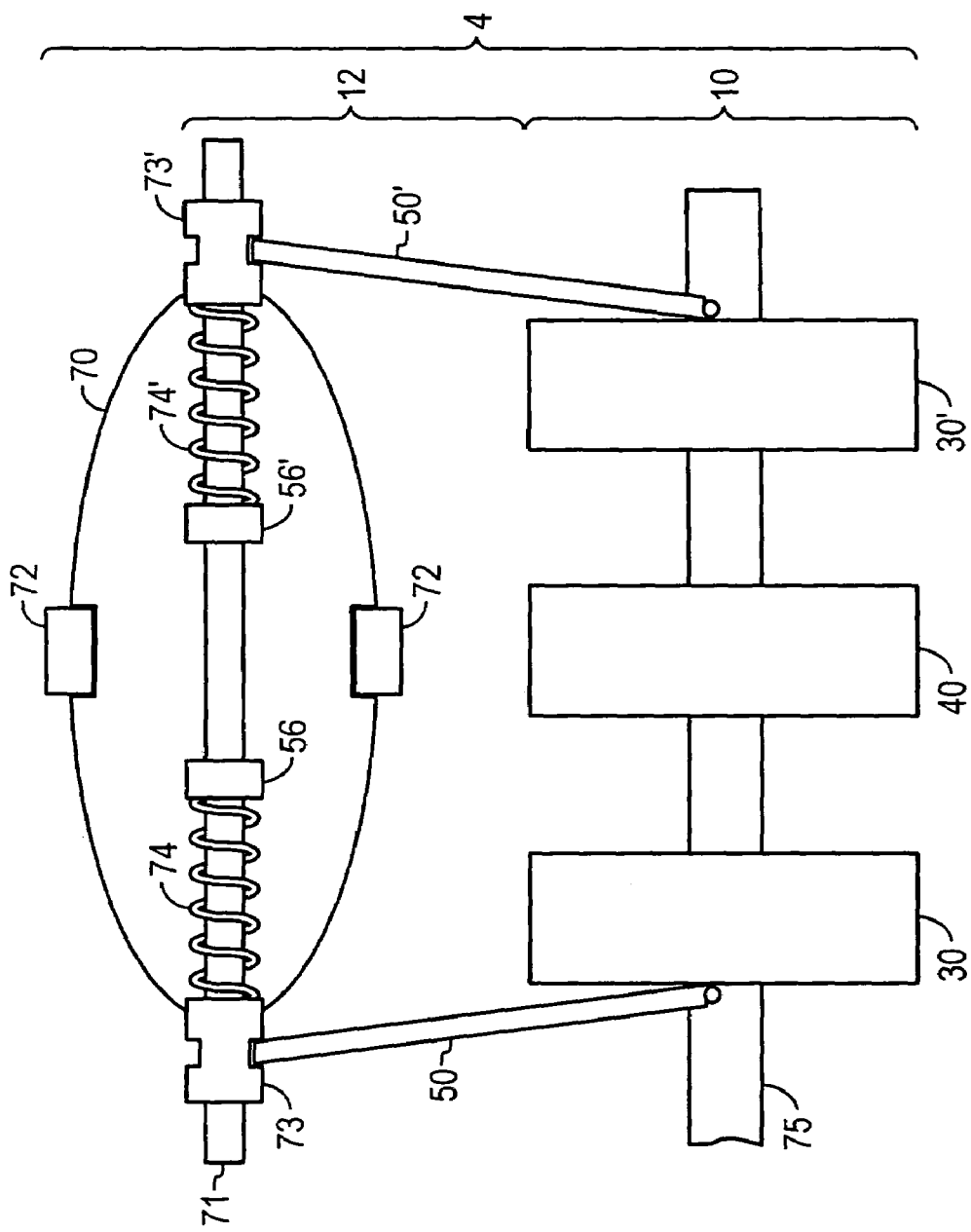
FIG. 1 is a schematic diagram of an embodiment of the centrifugal governor, constructed in accordance with the present invention.

In brief overview and referring to FIG 1, a generator with an alternate current power generator 4 constructed in accordance with the invention includes a generator portion 10 and a governor portion 12. The generator portion 10, in one embodiment includes a pair of magnetic disks 30, 30' (generally 30) attached to a shaft 75. Located between the magnetic disks 30 is a stationary armature 40. In operation, the shaft 75 is driven in to rotation by a mechanical source such as a crank or a windmill. As the shaft 75 rotates, so do the magnetic disks 30 relative to the armature 40. The magnetic field lines between the two rotating magnetic disks 30 are cut by the armature 40. The moving field lines caused by the rotating magnetic disks 30 induce a current in the armature 40 which is used to power external devices. In an alternate embodiment, the armature 40 fixed to the rotating shaft 75 and the magnetic disks 30 are held stationary.

The governor portion 12, in one embodiment, includes a secondary shaft 71 to which are attached weights (generally 72) by way of connectors 73. The secondary shaft 71 is driven by the shaft 75 of the generator portion 10. As the secondary shaft 71 rotates, the weights 72 move outward away from the secondary shaft 71 by centrifugal force, pulling the connectors 73 toward one another. The motion of the connectors 73, by way of lever arms 50, 50' (generally 50), causes the magnetic disks 30 to move toward the armature 40, decreasing the air gap between the magnetic disks 30 and the armature 40, and thereby changing the magnetic field flux experienced by the armature 40. The increase in field flux experienced by the armature 40 as the magnets 30 are moved toward the armature 40 causes the current induced in the armature 40 to increase.

The governor portion 12 need not be driven by the secondary shaft 71. In another embodiment, the generator portion 10 and the governor portion 12 are on the same shaft 75, connected through a mechanical linkage.

Figure 1A:
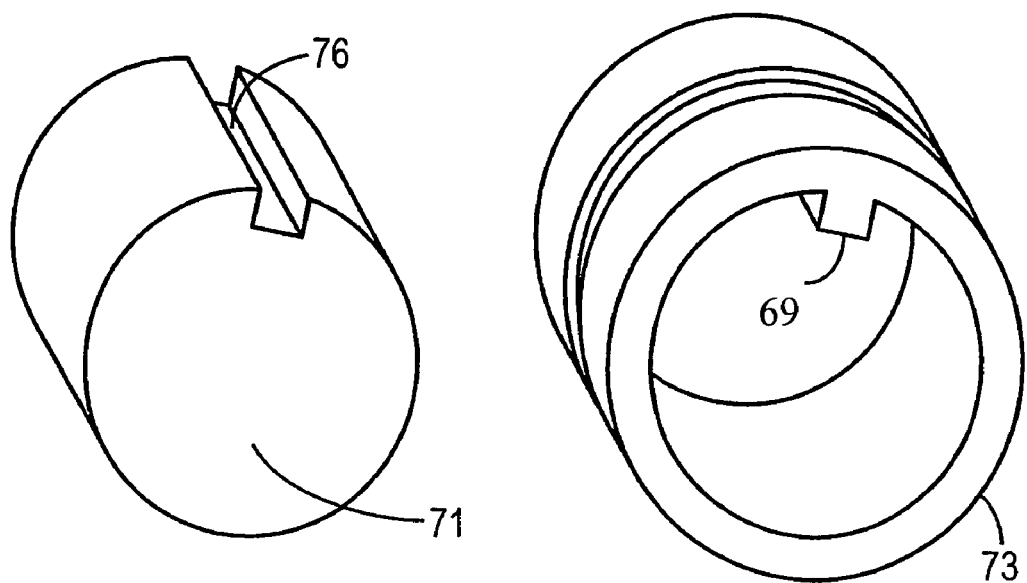
FIG. 1A is a depiction of the key and groove portion of the connectors and secondary shaft of FIG. 1.

Referring also to FIG. 1A, considering the governor portion 10 in more detail, two connectors 73, 73' (generally 73) are slidably attached to the secondary shaft 71. Each connector 73, 73' includes a key 69 which slidably fits within a groove 76 that is cut along the longitudinal surface of the secondary shaft 71. In this way, the connectors 73 may move freely and longitudinally along the secondary shaft 71 and yet rotate with the secondary shaft 71 as the secondary shaft 71 rotates.

Referring back to FIG. 1, the connectors 73 are biased toward the ends of the secondary shaft 71 by springs 74, 74' (generally 74). In the embodiment shown, each connector 73 is associated with a respective spring 74. The springs 74 enable the weights 72 to be biased toward their initial positions at the ends of the secondary shaft 71 as the governor's 12 rotational speed decreases. In one embodiment, one end of the spring 74 is in contact with its respective connector 73 while the other end of the spring is in contact with a respective one of two stops 56, 56' (generally 56), located near the center of the secondary shaft 71. In another embodiment, both springs 74 are connected to one centrally located stop.

Considering the weights 72 in more detail, the weights 72 are attached to flexible strips 70. Each flexible strip 70 is in contact with a respective connector 73 at each end of the flexible strip 70. The flexible strips 70, and attached weights 72 are positioned about the secondary shaft 71 to ensure balanced rotation. In one embodiment, two flexible strips 70 are diametrically opposed about the secondary drive shaft 71; one hundred eighty degrees apart. In another embodiment, three flexible strips are positioned about the secondary shaft 71; each being one hundred twenty degrees apart.

The flexible strips 70 are made of any flexible material that will bow in response to an outward force on the strip 70. In one embodiment, the flexible strips 70 are composed of metal. In another embodiment, the flexible strips 70 are composed of plastic. In one embodiment, the weights 72 are separate attachments to the outside of the flexible strips 70, which accentuate the centrifugal force. In another embodiment, the same effect can be achieved through using variable thickness flexible strips where the strips have a greater mass in the center, similar to attaching a weight.

Considering the lever arms 50 in more detail, two lever arms 50 connect the connectors 73 with respective magnets 30. Thus, when the rotating secondary shaft 71 moves the connectors 73 toward one another, the lever arms 50 are also pulled toward one another, pulling the magnetic disks 30 closer together.

Figure 1B:
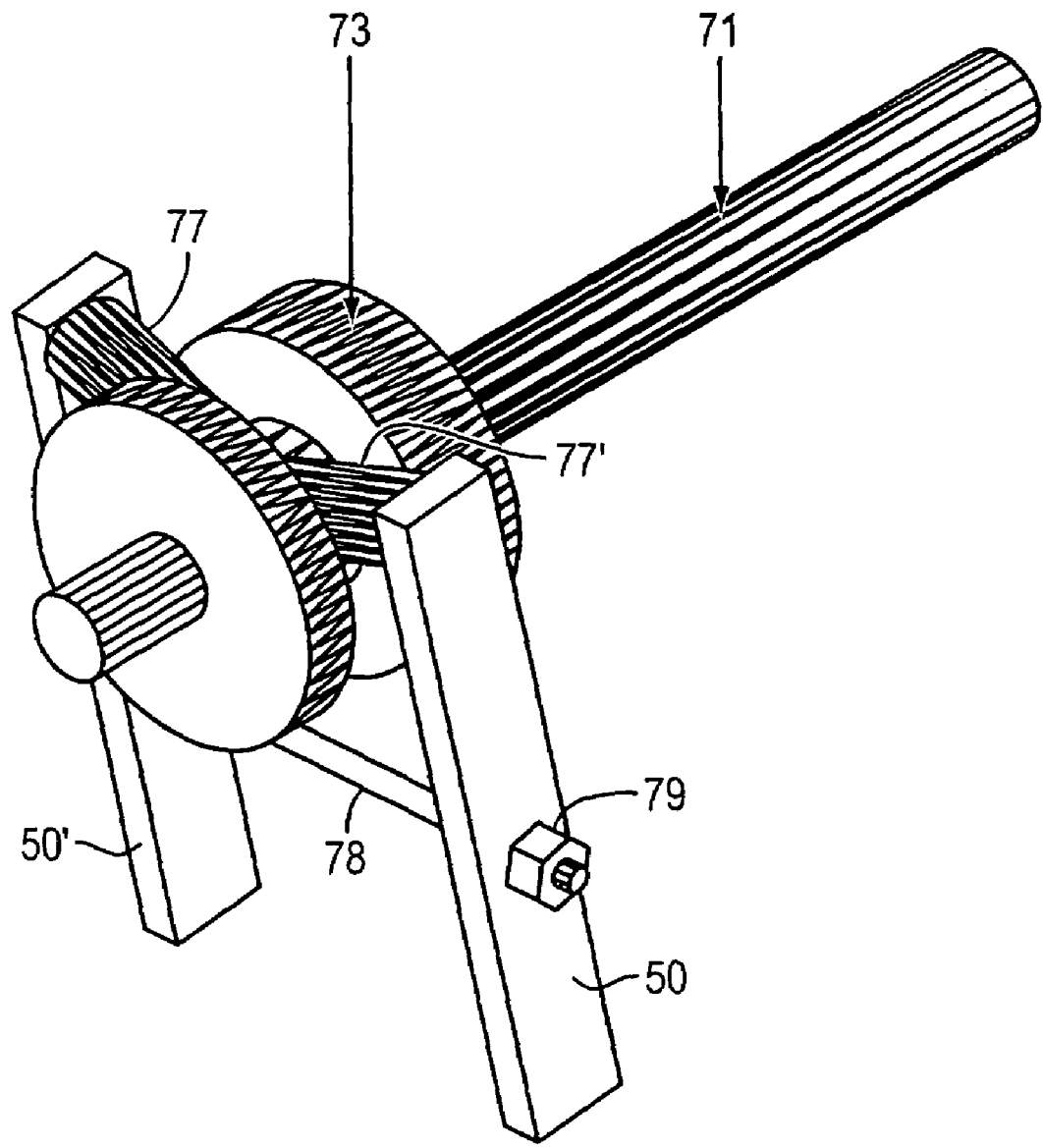
FIG. 1B is a depiction of the lever arms and connectors of FIG. 1.

Referring also to FIG. 1B, considering the lever arms 50 in more detail, the lever arms 50 may be affixed to the connectors 73 by means of two bolts 77 and 77' (generally 77). The bolts 77 attach the lever arms 50 to the outer surface of the connectors 73, such that the connectors 73 are free to slide longitudinally along the secondary shaft 71. In one embodiment, a stabilizing bar 78 may be secured via additional bolts 79 and 79' to the lever arms 50. This stabilizing bar 78 stabilizes the lever arms 50 as they move in response to the governor.

Figure 2:
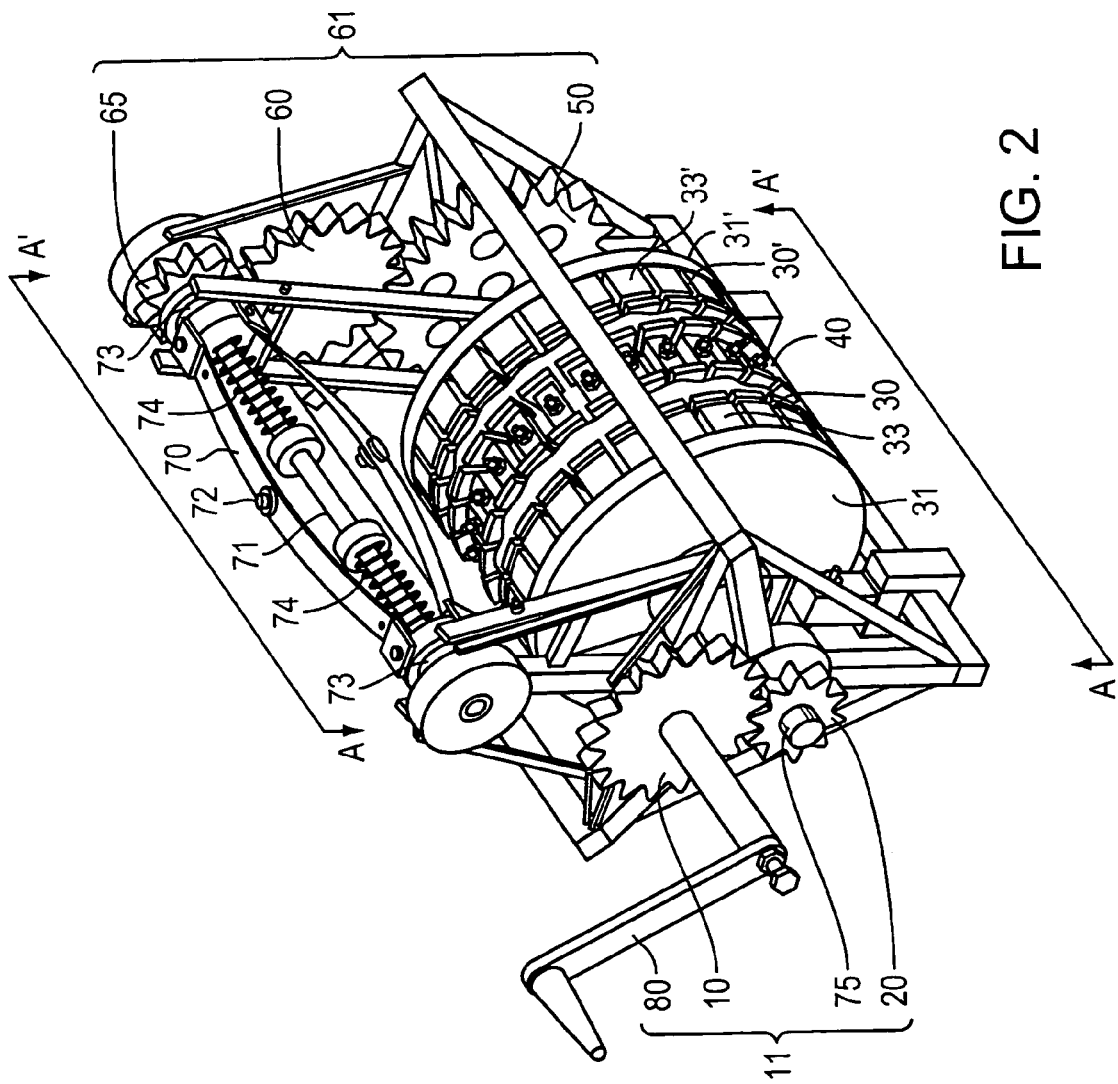
FIG. 2 is a perspective view of another embodiment of the centrifugal governor used in conjunction with a generator.

FIG. 2 depicts in more detail another embodiment of a generator 4 with a centrifugal governor 12. This embodiment is substantially similar to FIG. 1, but includes two gear trains, 11 and 61. The first gear train 11 includes a small gear 20 and a large gear 10 located between a handle 80 and a shaft 75. Large gear 10 has more teeth and has a larger circumference than small gear 20. In one embodiment, in which the large gear 10 has eighty teeth and small gear 20 has twenty five teeth, the small gear 20 rotates at almost three times for each rotation of the large gear 10. This gear train 11 permits a relatively slow turning of the handle 80 to be converted in to a higher rotational speed of the shaft 75.

Figure 3:
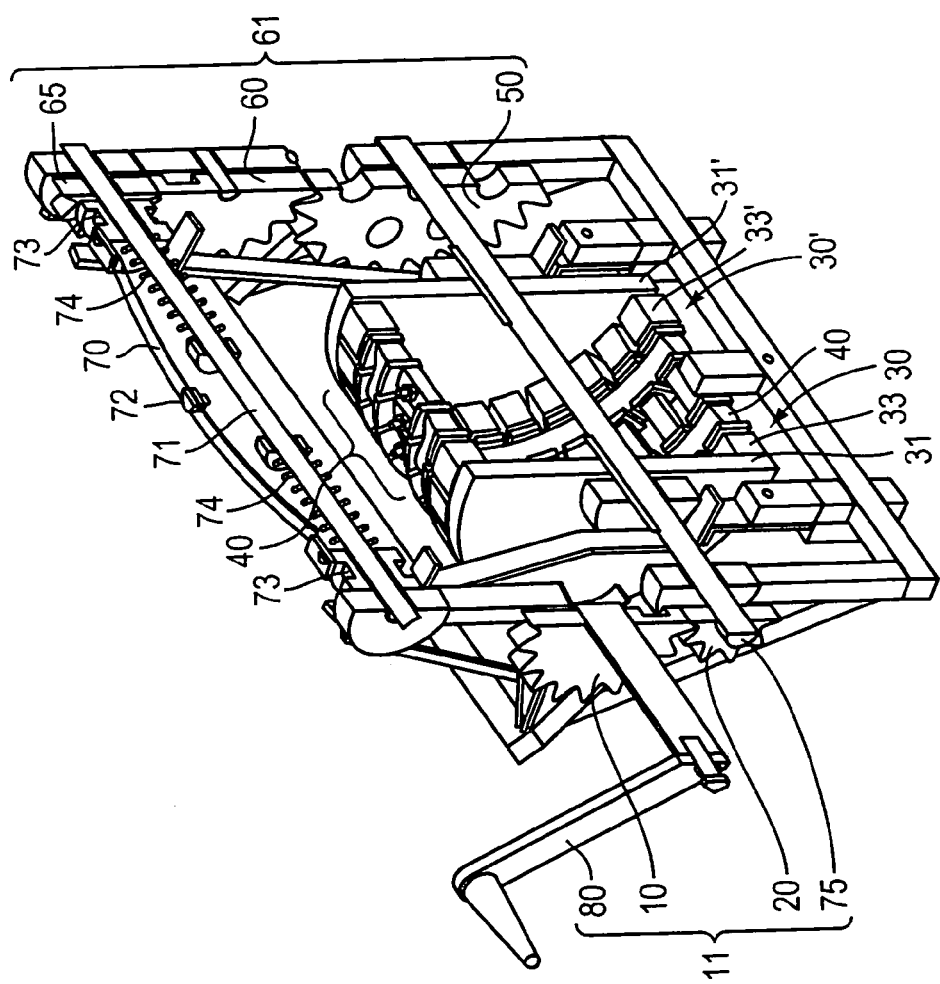
FIG. 3 is a cross-sectional view in the plane A, A' of FIG. 2.

The second gear train 61 includes three gears: first gear 50, second gear 60 and third gear 65 connecting the shaft 75 with the secondary shaft 71. First gear 50 is largest gear and the third gear 65 is the smallest gear. In one embodiment, the first gear 50 has one hundred twenty seven teeth, the second gear 60 has seventy teeth and the third gear 65 has twenty five teeth. This gear train permits the governor portion to be activated at low rotational speeds of shaft 75. FIG. 3 is a cross-section of FIG. 2 in the plane A, A'.

It should be noted that it is not necessary that the secondary shaft 71 be driven by a gear train. Instead, shaft 75 may drive shaft 71 by a belt or other means known to one skilled in the art.

Considering the magnetic disks 30 and armature 40 in greater detail, in one embodiment, shown in FIG. 2, twenty two magnets 33, 33' (generally 33) are attached to aluminum disks 31, 31' (generally 31) to form the magnetic disks 30 on the shaft 75. The magnets 33 are arranged on one disk 31 such that they are the same polarity as the corresponding magnet on the other disk 31': i.e. N-N, S-S. This arrangement makes the two sets of magnets 33, 33' repel each other. This repulsion in conjunction with the force of the governor 12 pushing the sets of magnets 33, 33' toward the armature 40, keeps the sets of magnets 33, 33' at a specific location on the shaft 75 for a given shaft rotational speed.

In more detail, the air gap between the sets of magnets 33, 33' and armature 40 is larger at low wind speeds. Since the distance between the magnets 33, 33' is larger, the repulsion between the two sets of magnets 33, 33' is less. Thus, with less magnet repulsion, less force is required to initiate rotation of the shaft 75. Therefore, the shaft 75 can begin rotation at lower wind speeds and as a result produce power at lower wind speeds. As the wind speed increases, the governor decreases the air gap. This changes the magnetic flux and thus produces more power output of the generator. Therefore, this invention allows a wind generator to start producing power at lower wind speeds and also increases power output at moderate to high wind speeds through a variable air gap.

Figure 4:
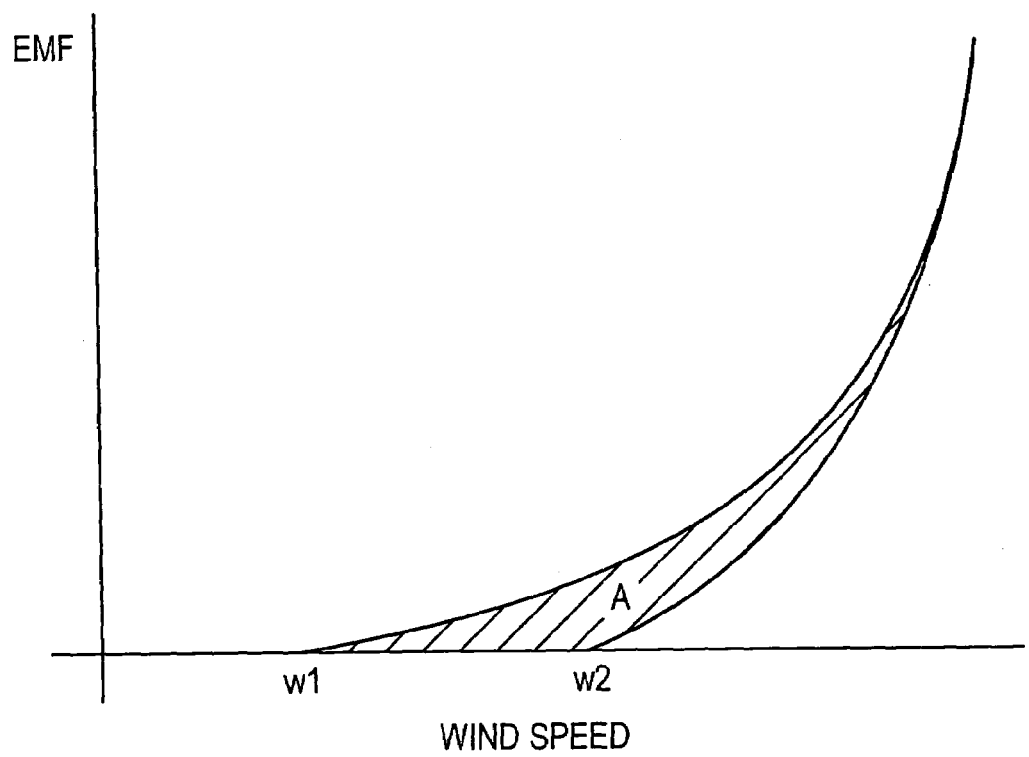
FIG. 4 is a graph of electromotive force versus wind speed for a generator constructed in accordance with the invention.

FIG. 4 is a graph of electromotive force (EMF) produced by the invention for various wind speeds. $W_2$ represents the starting wind speed of a conventional wind powered generator. That is, the windspeed necessary to cause the generator shaft to start spinning and an EMF to be generated. $W_1$ represents the starting wind speed for the current invention. As FIG. 4 indicates, this invention produces electromotive force at lower wind speeds than conventional wind generators. This enables the wind generator operator to derive power from the generator at low wind speeds. The area (A) is the amount of EMF that the present invention generates in excess of conventional generators.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An alternate current power generator comprising:
    a primary drive shaft;
    a first and second magnet arranged about an armature on the primary drive shaft, the first and second magnets are movable relative to each other about the armature; and
    a governor moving the first and second magnets with respect to one another in response to rotation by the governor.

2. The alternate current power generator of claim 1 further comprising a secondary drive shaft driven by the primary drive shaft.

3. The alternate current Power generator of claim 2, wherein the governor comprises a plurality of flexible strips.

4. The alternate current power generator of claim 3, wherein each flexible strip comprises a centrally located weight.

5. The alternate current power generator of claim 2, wherein the primary and secondary drive shafts are connected through a gear assembly.

6. The alternate current power generator of claim 2, wherein the primary and secondary drive shafts are connected by a belt.

7. The alternate current power generator of clam 3, wherein the flexible strips are positioned about the secondary drive shaft to permit balanced rotation.

8. An alternate current power generator comprising:
a primary drive shaft;
a first and second magnet arranged about an armature on the primary drive shaft, the first and second magnets-movable relative to each other about the armature:
a secondary drive shaft driven by the primary drive shaft: and
a governor moving the first and second magnets with respect to one another in response to rotation by the governor,
wherein the armature is fixed and the magnets move relative to the armature, wherein the governor comprises a plurality of flexible strips, each flexible strip comprises a centrally located weight, wherein each of the flexible strips is attached to the secondary drive shaft by a connector and wherein the weights cause the flexible strips to move outward upon rotation drawing the connectors toward one another.

9. The alternate current power generator of claim 8 further comprising a spring located between the connectors.

10. The alternate current power generator of claim 9, wherein said spring comprises two springs located between the connectors and a central stop.

11. The alternate current power generator of claim 9, wherein said spring comprises two springs located between the connectors and two stops, each spring attached to a respective stop.

12. The alternate current power generator of claim 8 further comprising two lever arms each with a first end and a second end, the first end of each lever arm being connected to respective connector, the second end of each lever arm being attached to respective magnet wherein each lever arm moves its respective magnet relative to the armature.

13. An alternate current power generator comprising:
a first magnet and a second magnet arranged about an armature wherein the first magnet and the second magnet are movable in relation to each other about the armature; and
a centrifugal governor connected to the first magnet and to the second magnet such that the governor moves the magnets relative to each other in response to rotation.

* * * * *